United States Patent [19]

Concklin

[11] Patent Number: 5,736,052
[45] Date of Patent: Apr. 7, 1998

[54] ION EXCHANGE RESIN PARTICLE SEPARATION SYSTEM

[75] Inventor: John R. Concklin, Forest, Va.

[73] Assignee: Framatome Technologies, Inc., Lynchburg, Va.

[21] Appl. No.: 563,181

[22] Filed: Nov. 27, 1995

[51] Int. Cl.⁶ ........................................................ C02F 1/42
[52] U.S. Cl. ........................... 210/675; 210/676; 210/677; 210/269; 210/189; 210/190; 210/686; 209/158; 209/454
[58] Field of Search ........................ 210/675, 676, 210/677, 269, 189, 190, 686; 209/158, 159, 160, 161, 172, 172.5, 173, 454, 466, 486, 142, 143, 138, 139.1, 140, 141

[56] References Cited

U.S. PATENT DOCUMENTS

| | | | |
|---|---|---|---|
| 11,377 | 7/1854 | Jackson | 209/17 |
| 458,837 | 9/1891 | Pike | 209/17 |
| 2,744,840 | 5/1956 | Daniels et al. | 210/676 |
| 2,767,140 | 10/1956 | Fitch | 210/676 |
| 3,261,559 | 7/1966 | Yavorsky et al. | 241/24 |
| 3,298,950 | 1/1967 | Mindler | 210/189 |
| 3,385,787 | 5/1968 | Crits | 210/675 |
| 3,414,508 | 12/1968 | Applebaum et al. | 210/675 |
| 3,429,807 | 2/1969 | Burgess | 210/675 |
| 3,582,504 | 6/1971 | Salem et al. | 210/675 |
| 3,583,908 | 6/1971 | Crits | 210/675 |
| 3,595,385 | 7/1971 | Duff | 209/160 |
| 3,660,282 | 5/1972 | O'Brien | 210/675 |
| 3,700,592 | 10/1972 | DePree | 210/675 |
| 3,775,310 | 11/1973 | Conway et al. | 210/676 |
| 3,797,660 | 3/1974 | Miller | 209/160 |
| 3,826,761 | 7/1974 | Short | 210/675 |
| 3,831,750 | 8/1974 | Savall et al. | 209/160 |
| 4,088,563 | 5/1978 | Marquardt | 210/676 |
| 4,111,798 | 9/1978 | Peterson et al. | 209/172.5 |
| 4,120,786 | 10/1978 | Petersen et al. | 209/454 |
| 4,191,642 | 3/1980 | Limper | 209/158 |
| 4,191,644 | 3/1980 | Lembo et al. | 210/675 |
| 4,253,942 | 3/1981 | Gaumann | 209/161 |
| 4,263,145 | 4/1981 | Wirth, Jr. | 210/675 |
| 4,264,439 | 4/1981 | Lefevre et al. | 209/454 |
| 4,287,088 | 9/1981 | Sirkar | 209/172 |
| 4,298,696 | 11/1981 | Emmett | 210/675 |
| 4,301,001 | 11/1981 | Lofthouse | 209/17 |
| 4,383,046 | 5/1983 | Emmett | 210/662 |
| 4,388,417 | 6/1983 | Down et al. | 521/26 |
| 4,427,550 | 1/1984 | Priestley | 210/675 |
| 4,442,229 | 4/1984 | Emmett | 210/675 |
| 4,457,841 | 7/1984 | Emmett | 209/454 |
| 4,472,282 | 9/1984 | Crits | 210/675 |
| 4,663,051 | 5/1987 | Flynn et al. | 210/675 |
| 4,746,422 | 5/1988 | Grimm | 209/172 |
| 4,891,138 | 1/1990 | Chonan et al. | 210/675 |
| 4,913,803 | 4/1990 | Earls et al. | 209/17 |
| 4,961,843 | 10/1990 | Lewis | 209/158 |
| 5,196,122 | 3/1993 | O'Brien | 210/675 |
| 5,212,205 | 5/1993 | O'Brien | 210/676 |
| 5,297,683 | 3/1994 | Stengel, III | 209/17 |
| 5,392,921 | 2/1995 | Stengel, III | 209/17 |

FOREIGN PATENT DOCUMENTS 350  1/1899  United Kingdom.

*Primary Examiner*—Cynthia L. Nessler
*Attorney, Agent, or Firm*—Rhodes Coats & Bennett, L.L.P.

[57] ABSTRACT

An apparatus for continuously separating ion exchange resin particles with upwardly flowing carrier fluid. The apparatus includes a first vertically oriented separation vessel and a first collection vessel for receiving the first fraction of resin particles from the upper zone of the first separation vessel. A first rejuvenation tank is connected to the first collection vessel for receiving the first fraction of resin particles from the first collection vessel. In the preferred embodiment, the apparatus further includes a second vertically oriented separation vessel and a second collection vessel for receiving the first sub-fraction of the second fraction of resin particles from the upper zone of the second separation vessel.

14 Claims, 1 Drawing Sheet

ION EXCHANGE RESIN PARTICLE SEPARATION SYSTEM

BACKGROUND OF THE INVENTION (1) Field of the Invention

The present invention relates generally to particles of ion exchange resin used in water purification systems and, more particularly, to a dual-stage system and method for separating a mixture of anionic and cationic resin particles.

(2) Description of the Prior Art ion exchange resin particles have been used for many years to remove contaminants from water that is used in the steam generating systems of electric power plants. Additionally, ion exchange resins are frequently employed in other areas of the plants to produce purified make-up water, to purify primary coolant by side-stream purification, to purify liquid waste effluents and, in the case of nuclear plants, to purify water in reactor fuel storage pools. High purity water is often required in other industries as well, such as in the electronics industry for washing electronic components that must be absolutely free from impurities during manufacture.

To produce the highly purified water needed for a chosen application, water is typically passed through a bed of intermixed cationic and anionic resin particles. These resin particles remove ionic impurities from water by a mechanism of selective ion exchange on active sites in the matrix of the resin. This process continues until the active sites become saturated with ionic impurities.

When the ion exchange resins become saturated, they must either be replaced or rejuvenated. Because disposal of spent resin and replacement with new resin is expensive, the resin particles are typically cleaned, such as by ultrasonic cleaning, to remove surface contaminants and are then chemically rejuvenated to restore their ion exchange capabilities. Optimal ionic rejuvenation of the resin particles requires that the intermixed cationic and anionic particles first be separated as completely as possible. This is because cationic resin particles are rejuvenated with a very strong acid solution, such as a sulfuric or hydrochloric acid solution, whereas anionic resin particles are rejuvenated with a very strong caustic solution, such as a sodium hydroxide solution. Although some rejuvenation can take place with incomplete separation, when the resins are placed back in service, any cross-contamination of anionic and cationic resins during rejuvenation will have deleterious effects on performance of the resins.

Different techniques have been employed to separate different types of ion exchange resin particles for years. The principle method of separating a mixture of cationic and anionic exchange resin particles is via controlled hydraulic upflow in a vertical separation vessel. This technique requires that the cationic and anionic resin particles be manufactured with two different sizes and/or densities, thereby imparting different terminal settling velocities to the respective particles. The hydraulic upflow in the separation vessel is then calculated so that the cationic resin particles settle to the bottom, while the anionic resin particles are lifted to the top.

While particle separation is generally achieved in this way, limitations in conventional hydraulic upflow systems inherently result in some mixing of cationic and anionic particles at the interface formed therebetween in a separation vessel. This mixing is primarily caused by turbulence in the upwardly flowing water. Laminar flow or near laminar flow is therefore essential for optimal particle separation. Laminar flow is defined for purposes of this specification as fluid flow having a Reynolds number of less than 2000. By comparison, fluid flow having a Reynolds number of greater than 4000 is considered to be turbulent. In the case of ion exchange resin separating systems, fluid flow having a Reynolds number of less than 500 is desirable, and fluid flow having a Reynolds number of less than 200 is most preferable.

Previous attempts at effecting optimal separation of ion exchange resin particles have met with varying degrees of success. U.S. Pat. Nos. 5,392,921 and 5,297,683, both to Stengel, III, disclose a dual-stage process and apparatus for processing mixed resins. The first stage involves introducing the resins into a classifier tank. In the classifier tank, the resins are fluidized with upwardly flowing water, then allowed to settle into segments, the cationic particles generally settling at the bottom of the tank and the anionic particles generally settling at the top of the tank. Selected segments are then removed at various elevations from the classifier tank so that the remaining resin mixture can be more easily separated in the second stage. The second stage involves transferring the fluidized resin mixture into the center of a separator column. In the separator column, upward laminar hydraulic flow carries the smaller, less dense anionic resin particles to an anion outlet in the upper region of the separator column, while the larger, more dense cationic resin particles settle and are removed at a cation outlet in the lower region of the separator column. The resin particles are then sluiced along separate streams to an anion regeneration tank and a cation regeneration tank, respectively.

While the Stengel, III patents both disclose a dual-stage system for effectively separating resin particles, the system is not without disadvantages. First, the classifier tank requires that the resin particles be allowed to settle before segments are removed at various elevations. Settling and removing certain segments slows the separation process and requires a significant amount of action on the part of a person operating the system. Second, although the Stengel, III patents state that the classifier may be bypassed if desired and the fluidized resin particles may be introduced directly into the separator, this would result in less effective separation. By operating the system without the classifier, the process becomes simpler and faster but does so to the detriment of the completeness of resin particle separation.

U.S. Pat. No. 4,457,841 to Emmett is also directed to the regeneration of ion exchange materials. To better separate the cationic particles from the anionic particles, Emmett provides an intermediate layer of inert resin particles. The interface between the different ionic resin particles is thereby more clearly defined. In the apparatus of Emmett, resin particles are subjected to upward hydraulic flow in a first vessel and then allowed to settle so that the cationic particles are separated from the artionic particles by the intermediate layer of inert particles. Next the cationic resin particles are drained from the bottom of the first vessel into a second vessel. Transfer is terminated when the inert particles reach the bottom of the first vessel. Once divided between the first and second vessels, the artionic and cation particles, respectively, are cleaned and rejuvenated separately.

While Emmett discloses two vessels, only the first is used for separation of the resin particles. The second serves only to contain the cationic particles for cleaning and rejuvenation after separation, not for separation itself. In addition, the Emmett process is not fast and continuous but is slow, requiring the resin particles to be separated one batch at a time. Further, the process requires that each batch of particles be allowed to settle for optimum separation, which also takes a significant amount of time.

U.S. Pat. No. 4,913,803 to Earls et al. and U.S. Pat. No. 4,120,786 to Petersen et al. also disclose methods and apparatuses for separating ion exchange resin particles. In both of these patents, a single vessel is used to separate the different particles in a continuous manner using an upward laminar flow carrier fluid. Earls et al. also discloses the use of a sieve to better separate the particles. While these processes are continuous, and therefore expeditious, only one vessel is used. Accordingly, these relatively simple processes are limited in their ability to optimize resin particle separation.

Other patents that disclose separating particles of different sizes and/or densities by using an upwardly flowing carrier fluid in a separation vessel include U.S. Pat. No. 3,261,559 to Yavorsky et al. and U.S. Pat. No. 458,837 to Pike, both of which relate to separating particles of ore, such as coal. Yavorsky et al. discloses separating coal ore using two different fluidizing separation vessels. First, coal ore is pre-separated into large and small particles, which are then directed to different separating vessel. A vessel with high velocity upwardly flowing fluid separates the large particles of coal ore, and a second vessel with lower velocity upwardly flowing fluid separates the smaller particles of coal ore. Additionally, relatively small particles separated in the high velocity vessel are subsequently pulverized and subjected to further separation in the low velocity separation vessel.

Pike discloses an ore washer and concentrator, wherein upflow from a supply pipe transports waste or "gangue" from the ore through perforations in a grating element in the bottom of the washer. The ore then falls to the bottom of the washer and is drawn out through a valve, while the waste is raised or lifted through a pipe by a pump. If needed, a second washer or concentrator is provided. If so, the pump for the first washer discharges matter into a second grating, and the pump for the second washer or concentrator is at run at a speed less than that of the pump for the first washer.

Despite the advances that have been achieved, there remains a need for a new and improved apparatus for separating different ion exchange resin particles continuously while, at the same time, requires little operator action yet nearly completely separates cationic and anionic particles in as little time as possible.

SUMMARY OF THE INVENTION

The present invention is directed to an apparatus for continuously separating ion exchange resin particles with upwardly flowing carrier fluid. The apparatus includes a first vertically oriented separation vessel having upper and lower zones and including a resin inlet for delivering a mixture of ion exchange resin particles having different terminal settling velocities into the interior of the separation vessel, an upper outlet for removing a first fraction of resin particles that have a relatively low terminal settling velocity from the upper zone of the separation vessel; and a lower outlet for removing a second fraction of resin particles that have a relatively high terminal settling velocity from the lower zone of the separation vessel.

The apparatus further includes a first collection vessel for receiving the first fraction of resin particles from the upper zone of the first separation vessel and a first rejuvenation tank connected to the first collection vessel for receiving the first fraction of resin particles from the first collection vessel.

A first recycle line drains carrier fluid from the first collection vessel and directs the carrier fluid into the first separation vessel through a fluid inlet at a bottom of the first separation vessel. A first pump is located in the first recycle line for pumping the carrier fluid upwardly through the first separation vessel at a velocity greater than the terminal settling velocity of the first fraction of resin particles and at a velocity less than the terminal settling velocity of the second fraction of resin particles.

In the preferred embodiment, the apparatus further includes a second vertically oriented separation vessel having upper and lower zones and including a resin inlet for delivering the second fraction of resin particles into the interior of the second separation vessel; an upper outlet for removing a first sub-fraction of the second fraction of resin particles that have a relatively low terminal settling velocity from the upper zone of the separation vessel; and a lower outlet for removing a second sub-fraction of the second fraction of resin particles that have a relatively high terminal settling velocity from the lower zone of the second separation vessel.

The apparatus further includes a second collection vessel for receiving the first sub-fraction of the second fraction of resin particles from the upper zone of the second separation vessel. A second recycle line drains carrier fluid from the second collection vessel and directs the carrier fluid into the second separation vessel through a fluid inlet at a bottom of the second separation vessel. A second pump located in the second recycle line pumps the carrier fluid upwardly through the second separation vessel at a velocity greater than the terminal settling velocity of the first sub-fraction of the second fraction of resin particles and at a velocity less than the terminal settling velocity of the second sub-fraction of the second fraction of resin particles.

Accordingly, one aspect of the present invention is to provide an apparatus for continuously separating ion exchange resin particles with upwardly flowing carrier fluid. The apparatus includes: (a) a first vertically oriented separation vessel having upper and lower zones, the vessel including: (i) a resin inlet for delivering a mixture of ion exchange resin particles having different terminal settling velocities into the interior of the separation vessel; (ii) an upper outlet for removing a first fraction of resin particles that have a relatively low terminal settling velocity from the upper zone of the separation vessel; and (iii) a lower outlet for removing a second fraction of resin particles that have a relatively high terminal settling velocity from the lower zone of the separation vessel; (b) a first collection vessel for receiving the first fraction of resin particles from the upper zone of the first separation vessel; (c) a first recycle line for draining carrier fluid from the first collection vessel and directing the carrier fluid into the first separation vessel through a fluid inlet at a bottom of the first separation vessel; and (d) a first pump located in the first recycle line for pumping the carrier fluid upwardly through the first separation vessel at a velocity greater than the terminal settling velocity of the first fraction of resin particles and at a velocity less than the terminal settling velocity of the second fraction of resin particles.

Another aspect of the present invention is to provide an apparatus for continuously separating ion exchange resin particles with upwardly flowing carrier fluid. The apparatus includes: (a) a vertically oriented separation vessel having upper and lower zones, the vessel including: (i) a resin inlet for delivering a mixture of ion exchange resin particles having different terminal settling velocities into the interior of the separation vessel; (ii) an upper outlet for removing a first fraction of resin particles that have a relatively low terminal settling velocity from the upper zone of the separation vessel; and (iii) a lower outlet for removing a second fraction of resin particles that have a relatively high terminal settling velocity from the lower zone of the separation vessel; (b) a collection vessel for receiving the first fraction of resin particles from the upper zone of the separation vessel; (c) a recycle line for draining carrier fluid from the collection vessel and directing the carrier fluid into the separation vessel through a fluid inlet at a bottom of the separation vessel; (d) a pump located in the recycle line for pumping the carrier fluid upwardly through the separation vessel at a velocity greater than the terminal settling velocity of the first fraction of resin particles and at a velocity less than the terminal settling velocity of the second fraction of resin particles; and (e) a rejuvenation tank connected to the collection vessel for receiving the first fraction of resin particles from the collection vessel.

Still another aspect of the present invention is to provide an apparatus for continuously separating ion exchange resin particles with upwardly flowing carrier fluid. The apparatus includes: (a) a first vertically oriented separation vessel having upper and lower zones, the first separation vessel including: (i) a resin inlet for delivering a mixture of ion exchange resin particles having different terminal settling velocities into the interior of the separation vessel; (ii) an upper outlet for removing a first fraction of resin particles that have a relatively low terminal settling velocity from the upper zone of the separation vessel; and (iii) a lower outlet for removing a second fraction of resin particles that have a relatively high terminal settling velocity from the lower zone of the separation vessel; (b) a first collection vessel for receiving the first fraction of resin particles from the upper zone of the separation vessel; (c) a first rejuvenation tank connected to the first collection vessel for receiving the first fraction of resin particles from the first collection vessel; (d) a first recycle line for draining carrier fluid from the collection vessel and directing the carrier fluid into the separation vessel through a fluid inlet at a bottom of the separation vessel; (e) a first pump located in the first recycle line for pumping the carrier fluid upwardly through the separation vessel at a velocity greater than the terminal settling velocity of the first fraction of resin particles and at a velocity less than the terminal settling velocity of the second fraction of resin particles; (f) a second vertically oriented separation vessel having upper and lower zones, the second separation vessel including: (i) a resin inlet for delivering the second fraction of resin particles into the interior of the second separation vessel; (ii) an upper outlet for removing a first sub-fraction of the second fraction of resin particles that have a relatively low terminal settling velocity from the upper zone of the separation vessel; and (iii) a lower outlet for removing a second sub-fraction of the second fraction of resin particles that have a relatively high terminal settling velocity from the lower zone of the second separation vessel; (g) a second collection vessel for receiving the first sub-fraction of the second fraction of resin particles from the upper zone of the second separation vessel; (h) a second recycle line for draining carrier fluid from the second collection vessel and directing the carrier fluid into the second separation vessel through a fluid inlet at a bottom of the second separation vessel; and (i) a second pump located in the second recycle line for pumping the carrier fluid upwardly through the second separation vessel at a velocity greater than the terminal settling velocity of the first sub-fraction of the second fraction of resin particles and at a velocity less than the terminal settling velocity of the second sub-fraction of the second fraction of resin particles.

These and other aspects of the present invention will become apparent to those skilled in the art after a reading of the following description of the preferred embodiment when considered with the drawings.

DESCRIPTION OF THE PREFERRED EMBODIMENTS

Figure 1:
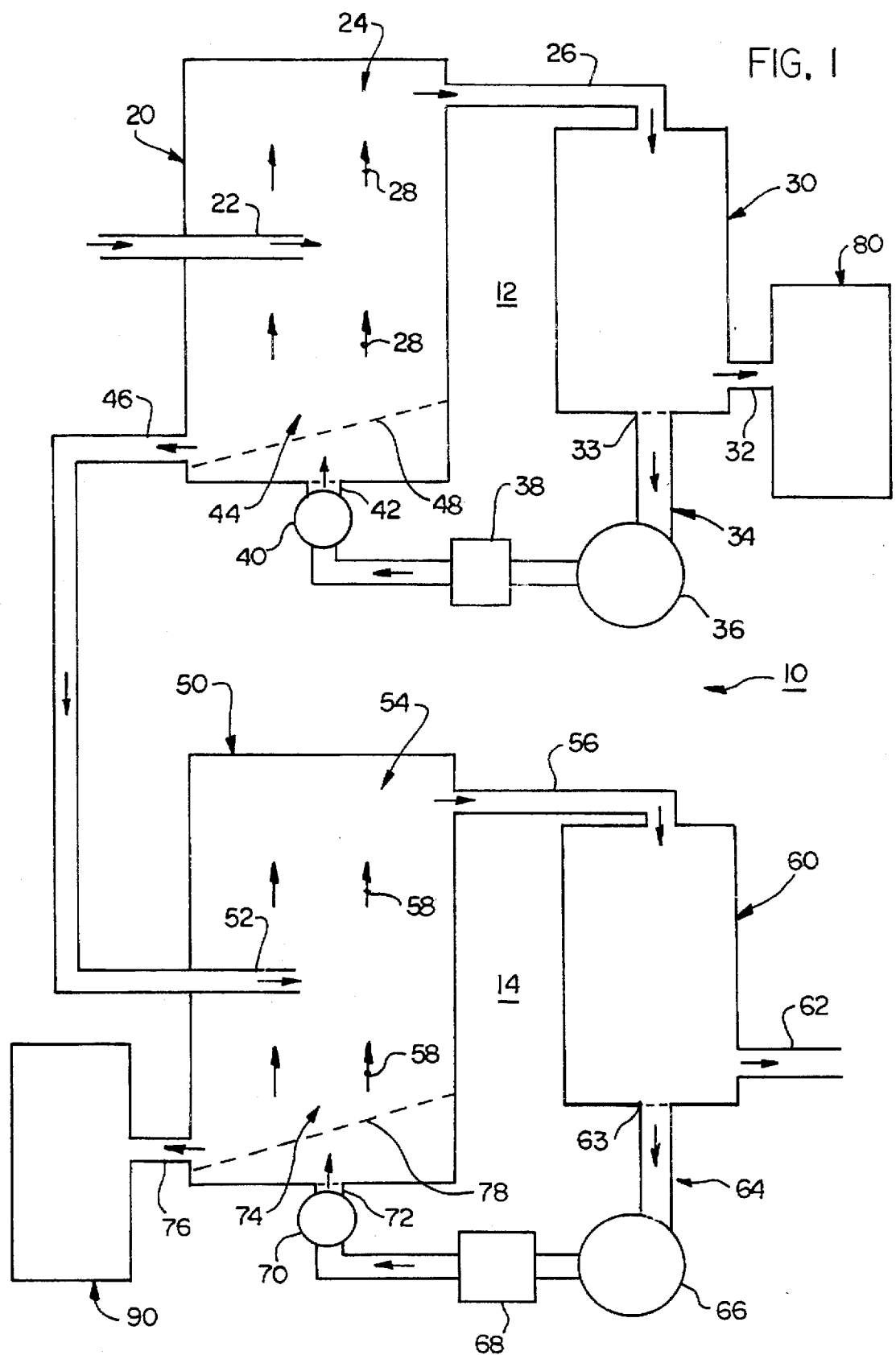
FIG. 1 is a schematic diagram of the two-stage system of the present invention for separating different ion exchange resin particles.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Referring now to the drawing, it will be understood that the illustrations are for the purpose of describing a preferred embodiment of the invention and are not intended to limit the invention thereto. The present invention is directed to a dual-stage system, generally designated 10, for separating ion exchange resin particles, which are used to purify water in, for example, nuclear power plants. The resin particles may be continuously fed into the system 10 for separation; there is no need to separate the particles one batch at a time.

First, it is helpful as background to describe the preferred form of the resin particles that are separated by the dual-stage system 10 of the invention. The system 10 is designed taking into consideration that usually available anionic resin particles ordinarily have a lower terminal settling velocity than cationic resin particles. If inert resin particles are used to provide an intermediate boundary layer, they should have a terminal settling velocity between those of the anionic and cationic particles. For example, the anionic resin particles may have a diameter of approximately 500 microns, a specific gravity of approximately 1.07, and a resulting terminal settling velocity of approximately 0.035 ft/sec. On the other hand, the cationic particles may have, for example, a diameter of approximately 600 microns, a specific gravity of approximately 1.25, and a resulting terminal settling velocity of approximately 0.09 ft/sec. The cationic and anionic resin particles are preferably homogeneously mixed; however, any ratio of cationic particles to anionic particles may be separated using the system 10 of the present invention.

The dual-stage system 10 of the present invention includes first and second stages, generally indicated by the numerals 12 and 14, respectively, for continuously separating anionic resin particles and cationic resin particles from the mixture thereof. In particular, the first stage 12 separates out a first fraction of anionic resin particles from the mixture. The remaining second fraction is then channeled into the second stage 14, which separates out a sub-fraction of cationic particles from the second fraction. The remaining sub-fraction, which includes unseparated anionic and cationic particles, and which may also include inert resin particles, may then be discarded.

Turning now to the components of each stage, the first stage 12 can be seen as including three general subcomponents: a first separation vessel 20, a first collection vessel 30, and a carrier fluid recycle line 34 with its associated components. The first separation vessel 20 is a vertically oriented tank that is designed to allow laminar or near-laminar upward hydraulic flow through its interior. As discussed earlier, laminar flow is essential for optimal resin particle separation. The first collection vessel 20 receives a mixture of ion exchange resin particles in a generally middle elevation of its interior through resin inlet 22. Upwardly flowing hydraulic carrier fluid, such as water, enters the collection vessel 20 through inlet 42 at the bottom of the vessel 20. The carrier fluid flows upwardly at, for example, 0.04 ft/sec through the interior of the vessel 20, as indicated by laminar flow lines 28. This causes the anionic particles to separate into a substantially pure first fraction in an upper zone 24 and the cationic particles to separate into a less pure second fraction in a lower zone 44. While a range of fluid velocities can be used, it is desirable for separation to occur that the carrier fluid flow rate be greater than the terminal settling velocity of the anionic resin particles, yet less than the terminal settling velocity of the cationic resin particles. By adjusting the carrier fluid velocity, the purity of the resin fractions can be controlled. Increased purity results in more resin being ultimately discarded, whereas less purity results in less resin being discarded. Therefore, the desired economics of resin purity versus discarded resin define the operation of the system 10.

The first fraction, which preferably includes substantially pure anionic resin particles is then directed from the upper zone 24 of the vessel 20 through an upper outlet 26 into the collection vessel 30. Although the collection vessel 30 is optional, the preferred embodiment of the invention 10 includes the collection vessel 30 to allow temporary storage of some volume of the first fraction. The collection vessel 30 includes an outlet 32 for draining anionic particles from the collection vessel to a conventional anionic rejuvenation tank 80 containing a caustic solution such as sodium hydroxide.

The carrier fluid is drained from the collection vessel through a recycle outlet 33, which preferably includes a screen or the like to prevent entry of anionic resin particles, into the fluid recycle line 34. The fluid recycle line 34 directs carrier fluid back to the fluid inlet 42 at the bottom of the separation vessel 20 through the action of a first stage recycle pump 36. To permit a control operator to detect the fluid flow rate, a flow meter 38 is provided in the recycle line 34. Additionally, a throttle valve 40 is provided in the recycle line 34 to adjust the carrier fluid flow rate. As should be appreciated, the pump 36 and throttle valve 40 are adjusted to optimize laminar flow 28 of the carrier fluid upwardly through the separation vessel 20. Preferably, the separation vessel 20 includes an angled flow distributor plate 48 positioned in the bottom of the separation vessel 20 above the fluid inlet 42. The flow distributor plate 48 is designed to ensure uniform, evenly distributed laminar flow throughout the entire volume of the separation vessel 20.

The second fraction of ion exchange resin particles contains mostly cationic resin particles, but may also include inert resin particles (if used) as well as some anionic resin particles that were not completely separated from the mixture in the first stage 12. This second fraction may be continuously removed from the lower zone 44 of the separation vessel 20 through a bottom outlet 46 and directed into the second stage 14 of the system 10. In the preferred embodiment, the flow distributor plate 48 helps direct resin particles into the bottom outlet 46. The second stage 14 of the system 10 is preferably configured similarly to the first stage 12, including a second separation vessel 50, a second collection vessel 60, and a second fluid recycle line 64.

The second separation vessel 50 is also a vertically oriented tank that includes a resin inlet 52 for directing the second fraction of resin particles into a generally middle elevation of the interior of the vessel 50. Upwardly flowing hydraulic carrier fluid enters the collection vessel 50 through inlet 72 at the bottom of the vessel 50. The carrier fluid flows upwardly at, for example, 0.07 ft/sec through the interior of the vessel 50, as indicated by laminar flow lines 58. This causes the inert resin particles and unseparated ionic resin particles to separate into a first sub-fraction in an upper zone 54 and the cationic particles to separate into a second, substantially pure sub-fraction in a lower zone 74. While a range of fluid velocities can be used, it is desirable for optimum separation to occur that the carrier fluid flow rate be greater than the terminal settling velocity of any remaining inseparable anionic resin particles, yet less than the terminal settling velocity of the cationic resin particles. It is also preferable, but not necessary, that the carrier fluid flow rate be greater than the terminal settling velocity of any inert resin particles. It is important to note that the fluid velocity in the first separation vessel 20 is preferably different than the fluid velocity in the second separation vessel 50, because the separation vessels are not used in the same manner. The first vessel 20 is used to separate out a substantially pure fraction of anionic resin particles; whereas, the second separation vessel 50 is used to separate out a substantially pure fraction of cationic resin particles.

As in the first stage 12, the upper, first subfraction is directed from the upper zone 54 of the second separation vessel 50 through an upper outlet 56 into the second collection vessel 60. Also, as with the first collection, vessel 30, the second collection vessel 60 is optional but preferably included in the second stage 14 to serve as temporary storage of some volume of the first sub-fraction. The collection vessel 60 includes an discard outlet 62 for draining the resin particles in the first, relatively impure sub-fraction from the collection vessel 60. This sub-fraction may be discarded, or may undergo further resin particle separation in a later process (not shown).

The carrier fluid is drained from the second collection vessel 60 through a recycle outlet 63 into the second fluid recycle line 64. The fluid recycle line 64 directs carrier fluid back to the fluid inlet 72 at the bottom of the separation vessel 50 through the action of a second stage recycle pump 66 in the recycle line 64. A flow meter 68 and a throttle valve 70 are also provided in the second recycle line 64, which are adjusted to optimize laminar flow 58 of the carrier fluid upwardly through the second separation vessel 50. Preferably, the second separation vessel 50 also includes an angled flow distributor plate 78 positioned in the bottom of the separation vessel 50 above the fluid inlet 72. As in the first separation vessel 20, the flow distributor plate 78 in the second separation vessel 50 is designed to ensure uniform, evenly distributed laminar flow throughout the entire volume of the second separation vessel 50.

The second sub-fraction, which consists of substantially pure cationic resin, may be continuously removed from the lower zone 74 of the second separation vessel 50 through a bottom outlet 76. In the preferred embodiment, the angled flow distributor plate 78 helps direct resin particles into the bottom outlet 78. The cationic resin particles are then directed into a conventional cationic rejuvenation tank 90 containing a strongly acidic solution such as hydrochloric or sulfuric acid.

With or without optional inert resin particles, the system and method of the invention more completely separates anionic and cationic resin particles than previously designed separation systems. One reason for the completeness of separation is through the use of two separation stages that, although preferably similar structurally, operate with different fluid flow parameters. Another reason is because instead of attempting to rejuvenate the sub-fraction of particles that is not entirely separated, this sub-fraction is simply discarded. While this wastes some ion exchange particles, the loss is minimal compared to the problems resulting from incorrect rejuvenation of the particles, caused by incomplete resin particle separation.

Certain modifications and improvements will occur to those skilled in the art upon a reading of the foregoing description. By way of example, in addition to being used to rejuvenate exhausted resins for reuse, the system of the invention may also be used to clean and classify unused resins prior to placing the resins into service. It should be understood that all such modifications and improvements have been deleted herein for the sake of conciseness and readability but are properly within the scope of the following claims.

I claim:

1. A method for continuously separating ion exchange resin particles, said method comprising the steps of:

(a) separating said particles in a first vertically oriented separation vessel having upper and lower zones, said first separation vessel including: (i) a resin inlet for delivering a mixture of ion exchange resin particles having different terminal settling velocities into the interior of said separation vessel; (ii) an upper outlet for removing a first fraction of resin particles that have a relatively low terminal settling velocity from the upper zone of said separation vessel; and (iii) a lower outlet for removing a second fraction of resin particles that have a relatively high terminal settling velocity from the lower zone of said separation vessel;

(b) receiving said first fraction of resin particles from the upper zone of said first separation vessel in a first collection vessel;

(c) receiving said first fraction of resin particles from said first collection vessel in a first rejuvenation tank connected to said first collection vessel;

(d) draining carrier fluid from said first collection vessel in a first recycle line and directing the carrier fluid into said first separation vessel through a fluid inlet at a bottom of said first separation vessel;

(e) pumping the carrier fluid upwardly through said first separation vessel at a velocity greater than the terminal settling velocity of said first fraction of resin particles and at a velocity less than the terminal settling velocity of said second fraction of resin particles by a first pump located in said first recycle line;

(f) separating said particles in a second vertically oriented separation vessel having upper and lower zones, said second separation vessel including: (i) a resin inlet for delivering said second fraction of resin particles into the interior of said second separation vessel; (ii) an upper outlet for removing a first sub-fraction of said second fraction of resin particles that have a relatively low terminal settling velocity from the upper zone of said separation vessel; and (iii) a lower outlet for removing a second sub-faction of said second fraction of resin particles that have a relatively high terminal settling velocity from the lower zone of said second separation vessel;

(g) receiving said first sub-fraction of said second fraction of resin particles from the upper zone of said second separation vessel in a second collection vessel;

(h) draining carrier fluid from said second collection vessel in a second recycle line and directing the carrier fluid into said second separation vessel through a fluid inlet at a bottom of said second separation vessel; and (i) pumping the carrier fluid upwardly through said second separation vessel at a velocity greater than the terminal settling velocity of said first sub-fraction of said second fraction of resin particles and at a velocity less than the terminal settling velocity of said second sub-fraction of said second fraction of resin particles by a second pump located in said second recycle line.

2. An apparatus for continuously separating ion exchange resin particles with upwardly flowing carrier fluid, said apparatus comprising:

(a) a first vertically oriented separation vessel means having upper and lower zones, said first separation vessel means including: (i) a resin inlet means for delivering a mixture of ion exchange resin particles having different terminal settling velocities into the interior of said separation vessel means; (ii) an upper outlet means for removing a first fraction of resin particles that have a relatively low terminal settling velocity from the upper zone of said separation vessel mean; and (iii) a lower outlet means for removing a second fraction of resin particles that have a relatively high terminal settling velocity from the lower zone of said separation vessel means;

(b) a first collection vessel means for receiving said first fraction of resin particles from the upper zone of said first separation vessel means;

(c) a first rejuvenation tank means connected to said first collection vessel means for receiving said first fraction of resin particles from said first collection vessel means;

(d) a first recycle line means for draining carrier fluid from said first collection vessel means and directing the carrier fluid into said first separation vessel means through a fluid inlet at a bottom of said first separation vessel means;

(e) a first pump means located in said first recycle line means for pumping the carrier fluid upwardly through said first separation vessel means at a velocity greater than the terminal settling velocity of said first fraction of resin particles and at a velocity less than the terminal settling velocity of said second fraction of resin particles;

(f) a second vertically oriented separation vessel means having upper and lower zones, said second separation vessel means including: (i) a resin inlet means for delivering said second fraction of resin particles into the interior of said second separation vessel means; (ii) an upper outlet means for removing a first sub-fraction of said second fraction of resin particles that have a relatively low terminal settling velocity from the upper zone of said separation vessel means; and (iii) a lower outlet means for removing a second sub-fraction of said second fraction of resin particles that have a relatively high terminal settling velocity from the lower zone of said second separation vessel means;

(g) a second collection vessel means for receiving said first sub-fraction of said second fraction of resin particles from the upper zone of said second separation vessel means;

(h) a second recycle line means for draining carrier fluid from said second collection vessel means and directing the carrier fluid into said second separation vessel means through a fluid inlet means at a bottom of said second separation vessel means; and (i) a second pump means located in said second recycle line means for pumping the carrier fluid upwardly through said second separation vessel means at a velocity greater than the terminal settling velocity of said first sub-fraction of said second fraction of resin particles and at a velocity less than the terminal settling velocity of said second sub-fraction of maid second fraction of resin particles.

3. The apparatus according to claim 2, wherein said second pump means pumps carrier fluid through said second separation tank means at a different velocity than said first pump means pumps carrier fluid through said first separation tank means.

4. The apparatus according to claim 2, wherein said second collection vessel means includes a recycle fluid outlet means for draining carrier fluid from said second collection vessel means into said second recycle line means.

5. The apparatus according to claim 2, wherein said second recycle line means includes a flow meter means and a throttle valve means.

6. The apparatus according to claim 2, wherein the lower outlet means of said second separation vessel means directs said second sub-fraction of said second fraction of resin particles from said second separation vessel means to a second rejuvenation tank means.

7. The apparatus according to claim 6, wherein said second sub-fraction of said second fraction of resin particles substantially includes cationic resin particles and wherein said second rejuvenation tank means is a cationic rejuvenation tank means.

8. The apparatus according to claim 2, wherein said resin inlet means connected to said second separation vessel means is located between said upper outlet means and lower outlet means of said second separation vessel means.

9. The apparatus according to claim 2, wherein said second collection vessel means includes a discard outlet means for draining said first sub-fraction of said second fraction of resin particles from said second collection vessel means.

10. The apparatus according to claim 2, wherein said first fraction of resin particles substantially includes anionic resin particles and wherein said first rejuvenation tank means is an anionic rejuvenation tank means.

11. The apparatus according to claim 2, wherein said resin inlet means connected to said first separation vessel means is located between said upper outlet means and lower outlet means of said first separation vessel means.

12. The apparatus according to claim 2, wherein said first recycle line means includes a flow meter means and a throttle valve means.

13. The apparatus according to claim 2, wherein said first separation vessel means further includes an angled first flow distributor plate means positioned in the bottom of said first separation vessel means for ensuring uniform, evenly distributed laminar flow of the carrier fluid throughout said first separation vessel means.

14. The apparatus according to claim 13, wherein said second separation vessel means further includes a second angled flow distributor plate means positioned in the bottom of said second separation vessel means for ensuring uniform, evenly distributed laminar flow of the carrier fluid throughout said second separation vessel means.

* * * * *